US012672214B2

(12) United States Patent
Akatsuka

(10) Patent No.: US 12,672,214 B2
(45) Date of Patent: Jun. 30, 2026

(54) COLOR SELECTING METHOD FOR LIGHTING EQUIPMENT

(71) Applicant: Yuhei Akatsuka, Matsumoto (JP)

(72) Inventor: Yuhei Akatsuka, Matsumoto (JP)

( * ) Notice: Subject to any disclaimer, the term of this patent is extended or adjusted under 35 U.S.C. 154(b) by 104 days.

(21) Appl. No.: 18/641,325

(22) Filed: Apr. 19, 2024

(65) Prior Publication Data

US 2024/0357719 A1 Oct. 24, 2024

Related U.S. Application Data

(60) Provisional application No. 63/496,953, filed on Apr. 19, 2023.

(51) Int. Cl.
*H05B 45/20* (2020.01)

(52) U.S. Cl.
CPC .................................... *H05B 45/20* (2020.01)

(58) Field of Classification Search
CPC ........ Y02B 20/40; Y02B 70/30; Y02B 20/30; Y02B 80/00; Y02B 90/20; Y02B 10/10; Y02B 70/3225; Y02B 20/72; Y02B 30/70; Y02B 70/10; Y02B 10/30; Y02B 20/00; Y02B 10/70; Y02B 30/13; Y02B 10/20
See application file for complete search history.

(56) References Cited

U.S. PATENT DOCUMENTS

2020/0344965 A1* 11/2020 Song ........................ A01G 7/06

* cited by examiner

*Primary Examiner* — Monica C King

(57) ABSTRACT

This document proposes a color selecting method for lighting equipment, that enables an operator to perform an intended selection of color by intuitive steps of operation. Lighting device includes full color light source, such as RGB LED. The lighting device can process data, to control colors and brightness, can collect data from a connected computing devices via communication interface. The software on the computing device can generate a data to control lighting device, such as colors, timing, brightness, or other data related to the user such as time, or weather forecasts. The software on the computing device can send a combination of such data to lighting device which user prefer to use for lighting. The lighting device emits the light, based on the received data, may aid users willing to select the lighting color and control with ease. The software may aid users selecting the intended color for lighting.

20 Claims, 1 Drawing Sheet

COLOR SELECTING METHOD FOR LIGHTING EQUIPMENT

This application is Continuation of U.S. Application No. 63/496,953 filed on Apr. 19, 2023, the disclosure of which is incorporated by reference.

BACKGROUND

The problem with current methods to select color for full color lighting equipment, such as smart light bulbs, is that an operator, operating lighting equipment input panel, or operating computing device having software to select color for the light bulbs, requires a specific selection of colors, such as a preset color mode, assigned to a single, or several button on input panel, or listed on the software, or selecting one color from an image stored on the computing device.

The operator needs to reselect a color when he or she want to change the lighting color. And the operator needs to take several steps of operations, when he or she wants to select the intended color or colors based on their needs, and those intended colors may not provided as a preset colors, may lead to increased operation steps and time operating the software.

These operation steps to select colors, leads the operators pain to perform color selections to emit from the full color lighting equipment.

SUMMARY

This document proposes a color selecting method for lighting equipment, that enables an operator to perform an intended selection of color by intuitive steps of operation.

Lighting device includes full color light source to emit full color light, such as RGB LED.

The lighting device can process data, to control colors and brightness.

The lighting device can collect data from a connected computing devices via communication interface.

The software on the computing device can generate a data to control lighting device, such as colors, timing, brightness, or other data related to the user such as time, or weather forecasts.

The software on the computing device can send a combination of such data to lighting device which user prefer to use for lighting.

The software on the computing device can generate a combination of colors from image data stored or captured by computing device with ease. Generating a combination of colors from image data, user can generate more natural color for lighting, than selecting a colors from general color picker such as a general RGB color picker.

Due to the computing ability of lighting device, the lighting device will emit the light color, brightness and timing, based on the received data.

The lighting device may aid users willing to select the lighting color easily.

The software on the computing device may aid users selecting the intended color for lighting, by a simple selection of data.

This summary is provided to introduce simplified concepts concerning color selecting method for lighting equipment, which is further described below in the detailed description.

BRIEF DESCRIPTION OF THE DRAWINGS

The drawings illustrate an exemplary embodiment consisting of lighting device.

DETAILED DESCRIPTION OF THE EMBODIMENT(S)

Figure 1:
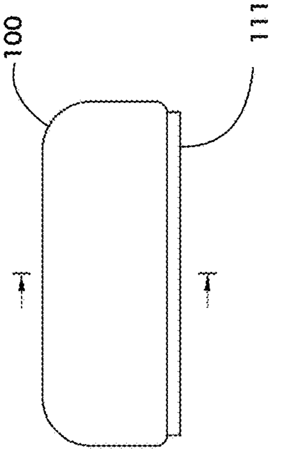
FIG. 1 is a perspective view illustrating an example of an external configuration of a lighting device 100 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

1. Configuration of an Lighting Device (1-1. Overview of a Configuration of a Lighting Device)

Figure 2:
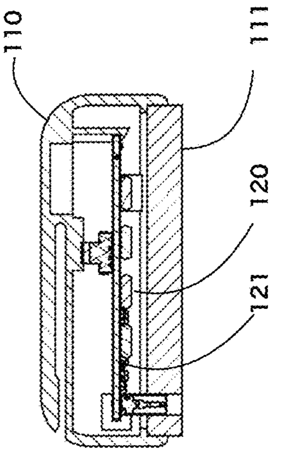
FIG. 2 is a cross-section view of the lighting device 100 illustrated in FIG. 1.

An overview of a configuration example of a lighting device 100 that is an example of a lighting device according to an embodiment of the present disclosure will be described with reference to FIGS. 1 and 2. FIG. 1 is a front view illustrating an example of an exterior configuration of the lighting device 100 according to an embodiment of the present disclosure. FIG. 2 is a cross-section view of the lighting device 100 illustrated in FIG. 1.

The lighting device 100 is a lighting device with which a user who is an operator can emit the light output. Using the computing device 200, the user can operate a lighting device 100 (see FIG. 3) connected to the computing device 200. The lighting device 100 is used as, for example, a portable lantern, connected to computing device.

The lighting device 100 has a case 110, a light guide 111 as shown in FIG. 2.

The lighting device 100 has a a circuit board having one or more full color light source 120, microcontroller 121, communication interface 122 as shown in FIG. 2.

The case 110 constitutes a housing of the lighting device 100. The case 110 has a light guide 111 which an output light of full color light source 120 can be defused.

The lighting device 100 has a microcontroller 121 as a computing ability of lighting device, and communication interface 122 to connect with computing device 200, the lighting device will emit the light color, brightness and timing, based on the received data, received from computing device 200.

(1-2. Functional Configuration of an Lighting Device)

Figure 3:
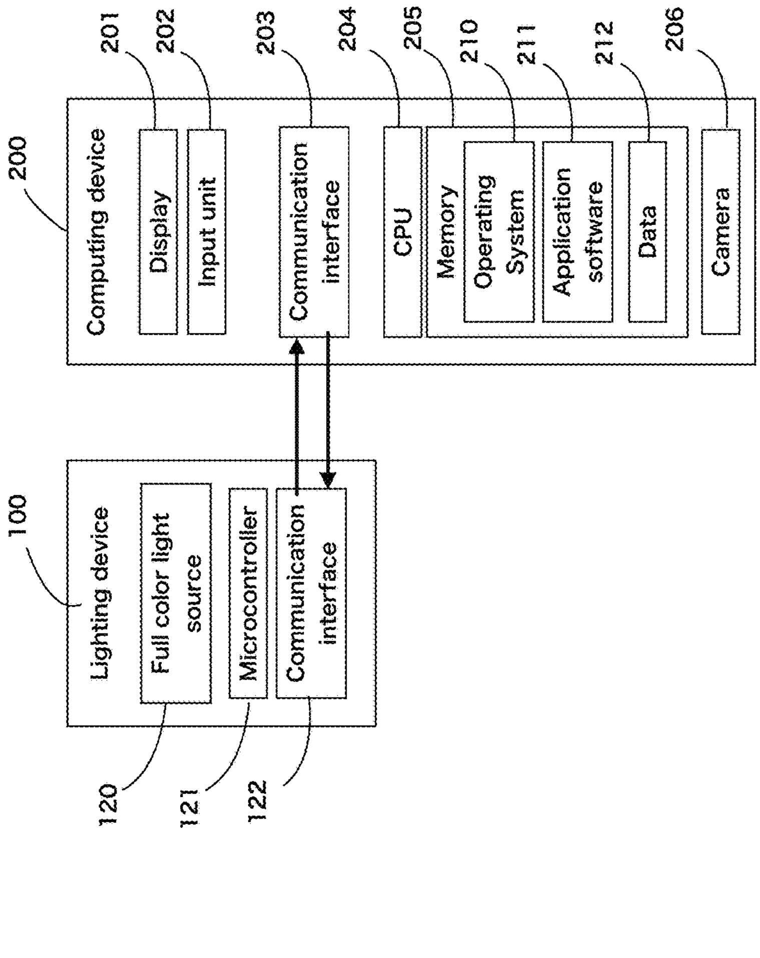
FIG. 3 is a block diagram illustrating an example of a functional configuration of a lighting device 100.

An example of a functional configuration of the lighting device 100 will be described with reference to FIG. 3. FIG. 3 is a block diagram showing an example of the functional configuration of the lighting device 100. As shown in FIG. 3, the lighting device 100 has a full color light source 120, microcontroller 121, communication interface 122.

The microcontroller 121 is a control unit that controls the lighting device 100. The microcontroller 121 according to the present embodiment functions as a computing ability to determine the light output such as color, brightness and timing based on data received from the computing device 200.

To be specific, the microcontroller 121 assigns the output of the each full color light source 120, based on the data from the computing device 200, output values of color, brightness and timing. The microcontroller 121 receives data from the communication interface 122.

The communication interface 122 transmits such data received from the computing device 200 to the microcontroller 121. The communication interface 122 receives output values transmitted from the computing device 200. The communication interface 122 transmits information in a wired or wireless manner.

Herein, a configuration example of the computing device 200 with which the lighting device 100 can communicate will be described with reference to FIG. 3. The computing device 200 has a communication interface 203, a CPU 204, a memory 205, and a display unit 201 that is an example of a display device such as smart phone.

The communication interface 203 transmits data to the communication interface 122 of the lighting device 100. The CPU 204 performs processes of programs stored in the memory 205.

Figure 4:
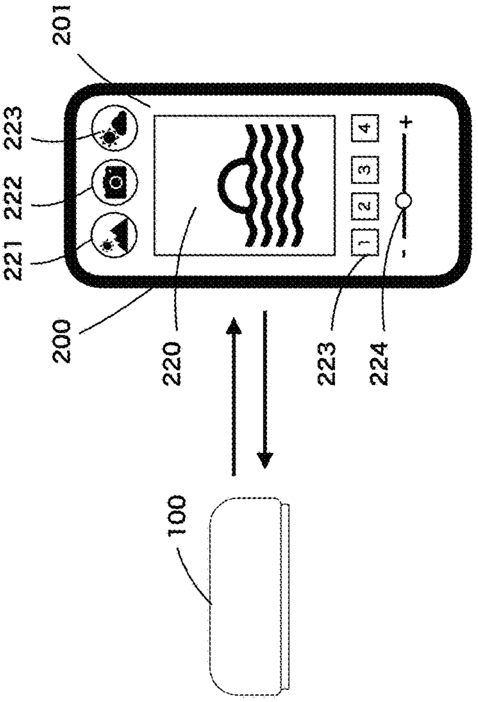
FIG. 4 is a diagram for describing software example to select lighting color to emit by lighting device 100.

FIG. 4 is a diagram illustrating an example of the microcontroller 121 of the lighting device 100 described above, assigns an output value of lighting on the lighting device 100. Accordingly, the user can perform operations on computing device 200, to emit light output from lighting device 100.

In addition, the microcontroller 121 assigns different light output values according to the data received from computing device 200. Accordingly, a plurality of light output patterns can be performed by a one time data transmission.

In addition, the microcontroller 121 assigns different light output values according to the data generated by application software 211. Accordingly, a plurality of light output patterns can be performed. For example, the application software 211 assigns several output values according to image data 212, stored on the memory 205, or image data 212, captured by camera 206, on computing device 200.

In addition, the microcontroller 121 assigns different light output values according to the data generated by application software 211. Accordingly, a plurality of light output patterns can be performed. For example, the application software 211 assigns different output values according to locations, or time, or weather forecast data generated by operating system 205, on the computing device 200.

The communication interface 122 receives such light output values of lighting, received from the microcontroller 121 to the computing device 200 connected to the lighting device 100. The communication interface 122 transmits information of the output values in a wired or wireless manner.

Herein, a configuration example of the computing device 200 with which the lighting device 100 can communicate will be described with reference to FIG. 3. The computing device 200 has a connection interface 203, a CPU 204, a memory 205, and a display 201 that is an example of a display device, input unit 202 such as mechanical switches or touch sensor.

The connection interface 203 transmits data of output values of lightings from the application software 211. The CPU 202 performs processes of programs stored in the memory 205 based on the data stored in the memory 205, or data generated by operating system 205.

FIG. 4 is a diagram illustrating an example of the display 201 of the computing device 200. On the display 201 shown in FIG. 4, a plurality of objects are arrayed in a regular order. Here, when the display 201 embodiment consisting a touch panel as an input unit 202, the user can touch and select an object displayed on the display 201. Accordingly, input unit 202 outputs values to operating system 211.

The microcontroller 121 described above assigns an output value of the full color light source 120 according to operation performed on the display 201. Accordingly, the user can perform operations on the display 201 to select output value of the lighting device 100.

FIG. 4 is a diagram illustrating an assignment examples of output values of lighting device 100.

For example, it is assumed that a user performs a color selection by selecting an image data stored on computing device 200. To be specific, the user selects an image data by pressing button 221, application software 211 generates several color, brightness and timing output value 223, associated with image data 220, the user moves his or her finger in right horizontal direction on button 223, application software 211 assigns increased brightness output value, associated with image data 220, and so forth.

For example, it is assumed that a user performs a color selection by capturing an image data by computing device 200. To be specific, the user selects an image data by pressing button 222, application software 211 generates several color, brightness and timing output value 223, associated with image data 220, the user moves his or her finger in right horizontal direction on button 223, application software 211 assigns increased brightness output value, associated with image data 220, and so forth.

For example, it is assumed that a user performs a color selection by selecting weather forecast data by computing device 200. To be specific, the user selects a data by pressing button 223, application software 211 generates several color, brightness and timing output value 223, associated with data such as weather, location and time and so forth.

The microcontroller 121 described above assigns an output value of the full color light source 120 according to the application software 211 generated data.

The application software 211 generated data consists of colors, brightness, timings, location, time, weather and so forth.

The application software 211 generates several colors, brightness and timings, from single image, video data, or location, time, weather and so forth.

For example, several colors results several colors fading effect by full color light source 120.

For example, the colors, brightness and timings, may result animation by several light source, such as flicker or wave and so forth.

For example, location, time and weather, may result to a users preferred color and animation effect by full color light source 120.

2. Conclusion

As described above, the lighting device 100 receives its light output reference data from application software 211 via computing device 200.

In addition, application software 211 assigns several output values according to image data 212, stored on the memory 205, or image data 212, captured by camera 206, or locations, or time, or weather forecast data generated by operating system 205, on the computing device 200.

In addition, the microcontroller 121 described above assigns an output value of the full color light source 120 according to the application software 211 generated data.

The application software 211 generated data consists of colors, brightness, timings, location, time, weather and so forth.

The application software 211 generates several colors, brightness and timings, from single image, video data, or location, time, weather and so forth.

In the case of the configuration described above, since the application software 211 generates reference data for light emit by lighting device 100, by a simple selection of data, user can select a preferred lighting color easily.

Accordingly, color selection for lighting device 100 can be easily selected without the user hesitating to perform several times of operation using the computing device 200, or lighting device 100.

Furthermore, according to application software 211 generated data, the light output of lighting device 100 may result to a users preferred color and animation effect by full color light source 120.

What is claimed is:

1. A color selecting method for lighting equipment, comprising:

receiving, by application software executed by a processor of a computing device, image data selected by a user, the image data being stored in a memory of the computing device or captured by a camera of the computing device;

generating, by the application software, a combination of colors associated with the image data, based on color information of the image data;

generating, by the application software, light output reference data including (i) the combination of colors and (ii) at least one of brightness data and timing data associated with the combination of colors;

transmitting, by the computing device, the light output reference data to a lighting device via a communication interface; and causing the lighting device to emit light according to the light output reference data.

2. The method of claim 1, wherein the combination of colors comprises a plurality of colors generated from a single image.

3. The method of claim 1, wherein generating the light output reference data comprises generating a plurality of brightness values and a plurality of timing values respectively associated with the plurality of colors.

4. The method of claim 1, wherein the image data comprises video data or image data extracted from video data.

5. The method of claim 1, wherein the light output reference data is transmitted in a single data transmission that enables a plurality of light output patterns to be performed by the lighting device.

6. The method of claim 1, wherein the timing data causes an animation effect including at least one of flicker, wave, and fading.

7. The method of claim 1, further comprising generating the light output reference data based at least in part on user-related data including at least one of location, time, and weather forecast data.

8. The method of claim 1, wherein the lighting device is a portable lantern.

9. The method of claim 1, wherein the lighting device comprises a full color light source including a red light emitting diode, a green light emitting diode, and a blue light emitting diode.

10. The method of claim 1, wherein the communication interface performs wired communication or wireless communication.

11. A lighting system, comprising:

a lighting device comprising a full color light source, a microcontroller, and a communication interface; and a computing device comprising a processor, a memory, a camera, and a communication interface, wherein the memory stores instructions that, when executed by the processor, cause the computing device to:

receive image data selected by a user, the image data being stored in the memory or captured by the camera;

generate a combination of colors associated with the image data, based on color information of the image data;

generate light output reference data including (i) the combination of colors and (ii) at least one of brightness data and timing data; and transmit the light output reference data to the lighting device via the communication interface, wherein the microcontroller controls the full color light source to emit light according to the light output reference data.

12. The lighting system of claim 11, wherein the lighting device further comprises a light guide configured to diffuse light emitted from the full color light source.

13. The lighting system of claim 11, wherein the lighting device is a portable lantern.

14. The lighting system of claim 11, wherein the microcontroller assigns different light output values according to the light output reference data such that a plurality of light output patterns are performed.

15. The lighting system of claim 11, wherein the communication interface is wireless.

16. A non-transitory computer-readable medium storing instructions that, when executed by a processor of a computing device, cause the computing device to:

receive image data selected by a user, the image data being stored in a memory of the computing device or captured by a camera of the computing device;

generate a combination of colors associated with the image data, based on color information of the image data;

generate light output reference data including (i) the combination of colors and (ii) at least one of brightness data and timing data associated with the combination of colors; and transmit the light output reference data to a lighting device to cause the lighting device to emit light according to the light output reference data.

17. The medium of claim 16, wherein the instructions cause the computing device to generate the combination of colors such that a plurality of colors are generated from a single image.

18. The medium of claim 16, wherein the instructions cause the computing device to generate the timing data that causes an animation effect including at least one of flicker, wave, and fading.

19. The medium of claim 16, wherein the instructions cause the computing device to transmit the light output reference data in a single data transmission enabling a plurality of light output patterns.

20. The medium of claim 16, wherein the instructions further cause the computing device to generate the light output reference data based at least in part on user-related data including at least one of location, time, and weather forecast data.

* * * * *